United States Patent
Carver

[15] 3,679,880
[45] July 25, 1972

[54] SIMULATED INSTRUMENTS
[72] Inventor: Fred F. Carver, Chenango Forks, N.Y.
[73] Assignee: The Singer Company, New York, N.Y.
[22] Filed: March 27, 1970
[21] Appl. No.: 23,152

[52] U.S. Cl............................235/151.34, 35/10.2, 235/183, 324/111
[51] Int. Cl.........................................G06g 7/56, G06g 7/72
[58] Field of Search.......................235/151.34, 183; 35/10.2

[56] References Cited

UNITED STATES PATENTS

| | | | |
|---|---|---|---|
| 3,541,320 | 11/1970 | Beall | 235/183 |
| 3,541,318 | 11/1970 | Miller | 235/183 |
| 3,374,362 | 3/1968 | Miller | 235/183 X |
| 3,558,867 | 1/1971 | Pahl, Jr. | 235/183 |

Primary Examiner—Eugene G. Botz
Assistant Examiner—Edward J. Wise
Attorney—Francis L. Masselle, William Grobman and Charles S. McGuire

[57] ABSTRACT

A simulated instrument for use in a vehicle simulator, or the like, to indicate the value of an assumed quantity, position, or other variable requiring the value to be held over a relatively long time constant. The invention provides means for deriving electrical signals to drive the instrument by long-term integration of a value indicating the rate of change of the variables. Means are provided for recycling the integrator at frequency, short intervals to maintain a high degree of accuracy.

10 Claims, 1 Drawing Figure

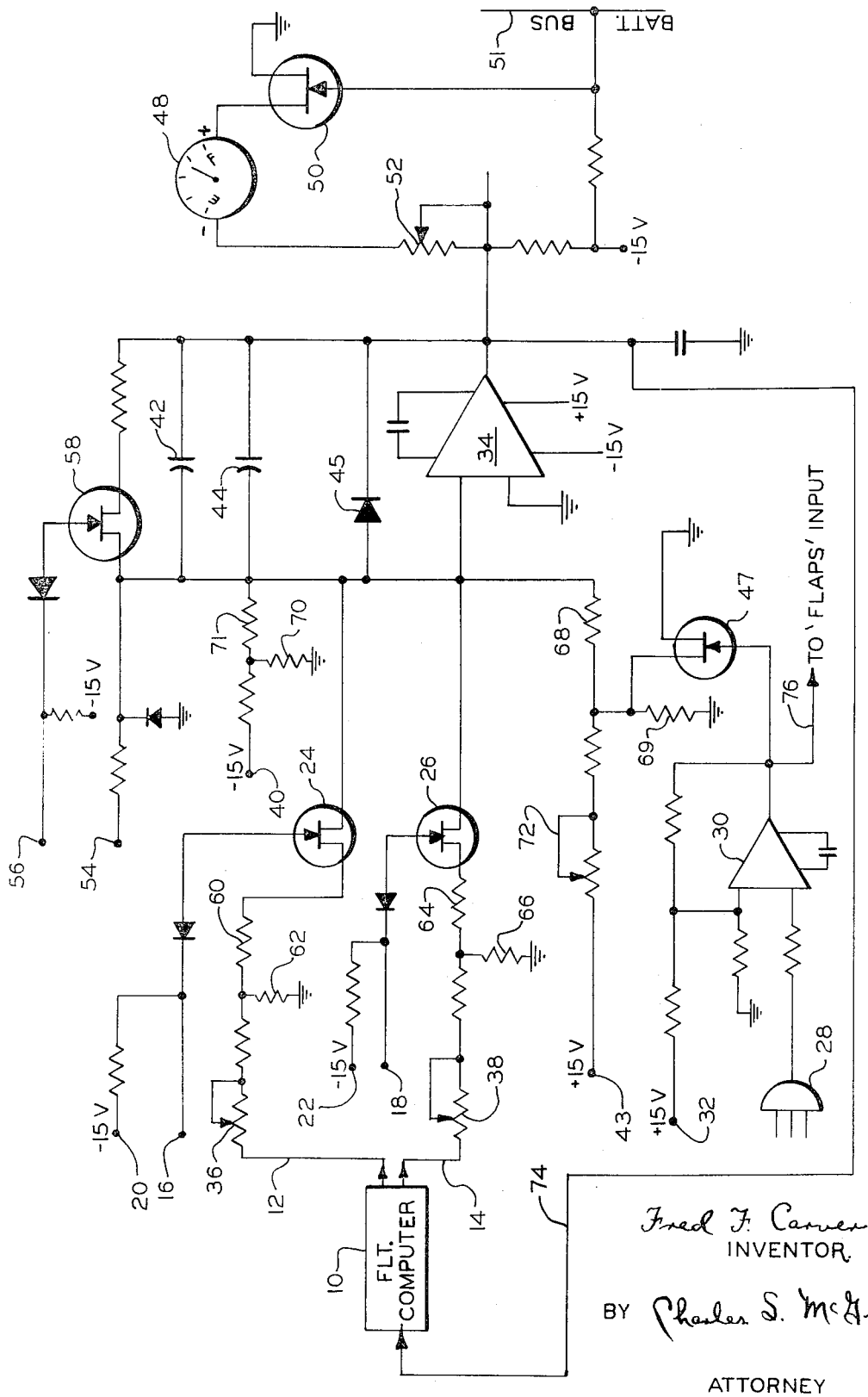

SIMULATED INSTRUMENTS

This invention relates to electrical means for driving simulated instruments, and more specifically to simulated instruments indicating quantities which vary over a relatively long time constant, such as fuel depletion gauges, for example.

The present invention is particularly useful in vehicle trainer or simulator applications wherein instruments or gauges are provided to indicate to a student operator the present condition of certain variable quantities associated with vehicle operation. It is common to provide such simulated instruments in the form of meter movements having an input from an appropriate RC circuit which establishes the time constant for variation of the quantity represented. For certain instruments, representing quantities which vary over long time constants, this requires the use of very large capacitors commonly having values of several thousand microfarads. Such instruments, of course, are subject to any cumulative errors in the system providing the charge on capacitor, as well as errors due to capacitor leakage, etc.

According to the present invention an input voltage representing the rate of change of the variable quantity is integrated to derive a voltage commensurate with the value of the quantity. This voltage is stored in capacitors and used to drive meter movement of the simulated instrument. Errors which would otherwise arise due to capacitor leakage, imbalance of the integrator, and other unavoidable imperfections, are essentially eliminated by providing additional reference voltage inputs. One such additional input is applied continuously and may be considered a reference error signal which is much larger than the aforementioned errors due to imperfections in the circuit components and assures a given polarity of output. The other additional input is applied at frequent, short intervals (e.g., 1,600 per second for one time increment out of eight) to balance the first additional input. Therefore, the integration rate due to the additional inputs is zero, since the net of the two inputs is zero, for intervals which are frequent enough that the capacitors do not have time to accumulate a significant charge due to the first additional input. Since the system essentially eliminates all significant errors due to component imperfections, much smaller and cheaper capacitors may be used while still maintaining a high level of signal relative to anticipated errors.

A principal object of the invention is to provide improved means for simulating the operation of instruments or gauges representing values which must be maintained over relatively long time constants.

Another object is to provide a simulated instrument of the type driven by a conventional meter movement wherein small capacitors may be used.

A further object is to provide a simple and inexpensive yet accurate electronic system for deriving through analog integration a signal to drive a meter movement for a simulated instrument.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing, in which the single FIGURE is a schematic diagram showing a preferred embodiment of the invention.

The invention will be described as used in a typical application, namely, in association with the simulated fuel depletion gauge of an aircraft trainer. It will be understood, however, that the invention may be employed in connection with other simulated instruments (e.g., flaps position, electric trim, etc.) in aircraft trainers, and may likewise be employed in other apparatus utilizing simulated instruments.

It is a common practice in present-day fixed base aircraft trainers to provide digital and/or analog computer means for calculating values representing flight variables. Such a computer is represented by the block numbered 10 in the drawing. Since the operation of the flight computer does not affect the present invention and many suitable examples thereof are in wide commercial use, further description is unnecessary. It is assumed that the disclosed embodiment is incorporated in an aircraft trainer having two simulated engines. Accordingly, the computer will receive certain inputs, e.g., throttle setting, and compute a rate of fuel flow to each engine. An output from computer 10 indicating fuel flow to the right engine is supplied on line 12, and an output representing fuel flow to the left engine is supplied on line 14.

Connected to terminals 16 and 18 are manual selector switches by means of which the student-operator of the trainer simulates selection of the fuel tanks which are connected to supply fuel to each engine. That is, two-engine aircraft have at least two separate fuel tanks, either of which may be selectively connected to either or both engines. A separate fuel depletion gauge is provided, of course, for each tank and, although the complete system for driving only one gauge is disclosed herein, it will be understood that duplicate systems are provided for each such gauge required and may utilize common portions of the circuitry, where appropriate. The selector switches are connected, with fixed bias voltages of −15v applied at terminals 20 and 22, to field effect transistors (FET's) 24 and 26, respectively. (A value of 15 volts DC, having appropriate polarity, has been chosen for purposes of the present disclosure as the reference voltage applied from a regulated source to operate the system and is applied at the terminals indicated.) Thus, FET's 24 and 26 act as valves, allowing the fuel flow signal from the computer to pass when the selector switch is in the position indicating that the simulated tank is connected to supply fuel to the corresponding engine.

Pulse trains from an appropriate master logic source are supplied at three different frequencies (e.g., 400, 800 and 1,600 cps) to AND gate 28, connected to the non-inverting side of amplifier 30. A +15v supply is connected from terminal 32 to the inverting side of amplifier 30. Since the gate 28 passes a signal only when all three pulses are present, at the pulse rates indicated a signal will be passed for one increment of time out of eight, at a rate of 1,600 per second. Thus, the +15v will be inverted to a negative voltage output of amplifier 30 for one out of each eight time increments.

The invention is based on the provision of input voltages to an analog integrator, such as operational amplifier 34 (e.g., National Semiconductor Corp. LM 201). The fuel flow rate signals from lines 12 and 14 are provided as an input to integrator 34 and integrated at a rate controlled by the setting of potentiometers 36 and 38. Additional inputs to integrator 34 are also provided in a particular manner in order to allow the use of small capacitors while maintaining a high degree of accuracy, as previously mentioned. A first additional input of −15v is applied at terminal 40; this input is in the nature of an error signal which will tend to drive the output of integrator 34 positive and will always be much greater than any error produced by imbalance of integrator 34, leakage of capacitors 42 and 44, or of diode 45, etc. A second additional input of +15v at terminal 43 is shunted to ground through FET 47 except for the time increments when a negative voltage output from amplifier 30 is applied to FET 47. During such time increments (one out of eight at 1,600 times per second) the +15v from terminal 43 opposes the −15v from terminal 40 and the net effect of the two additional inputs on integrator 34 is zero. Thus, although the additional input from terminal 40 is applied to integrator 34 without being balanced by an equal input of opposite polarity for seven time increments out of eight, this will have no appreciable effect on the charge on capacitors 42 and 44 since the integration rate of additional input is returned to zero 1,600 times per second. Also, the fact that the second additional input is applied for only one time increment out of eight reduces the probability of unwanted circuit transients affecting the integrated value.

Capacitors 42 and 44, preferably comprising polarized, tantalum capacitors having a value of less than 100 microfarads, are connected in parallel with one another and with integrator 34. The charge on capacitors 42 and 44 as determined by the output of integrator 34, is applied to one side of the meter movement which drives simulated fuel gauge 48, the other side being connected, through FET 50, to battery bus line 51 so that gauge 48 will be driven to the "E" position when the master switch is turned on even when there is no charge on the capacitors. Potentiometer 52 provides a final adjustment for setting the needle of gauge 48 to the desired position in response to a particular level of signal received.

Provision may be made for allowing the instructor to insert a signal which affects the indication of gauge 48 independently of the computed rate of fuel depletion. For this purpose, a potentiometer may be connected to terminal 54, selectively adjustable by the instructor to apply a signal variable from −15v to +15v in accordance with the potentiometer setting. This signal will be applied when a switch connected through terminal 56 to FET 58 is in the "on" position, and will have no effect on the system when the switch is in the "off" position. Likewise, resistors 64 and 66 form an identical voltage divider in the input from line 14, and resistors 68, 69, 70 and 71 provide voltage dividers for the additional inputs.

Resistors 60 and 62 form a voltage divider in line 12 to provide the low input voltage required. The low input voltage also insures that integrator 34 will operate slowly enough to allow calibration. This may be accomplished by connecting a digital voltmeter to the output of integrator 34 and adjusting to zero integration rate by the setting of potentiometer 72 after an initial voltage has been applied to the input to drive the integrator to some absolute value. This initial value is applied by means of the instructor's selective input at terminal 54.

An additional line 74 is connected from the output of integrator 74 back to flight computer 10 to indicate to the latter the weight of fuel remaining so that this may be taken into account in computations affected by gross weight of the aircraft. Line 76 may connect the output of amplifier 30 with circuitry similar to that described herein for driving other gauges or instruments requiring values to be maintained over long time constants, e.g., the flaps position indicator.

I claim:

1. Means for providing an electrical charge to drive a simulated instrument indicating a value which must be held over a long time constant, said means comprising:
   a. computer means providing an electrical signal commensurate with the rate of change of said value;
   b. integrating means receiving said signal as a primary input and generating an output voltage in response thereto;
   c. capacitive means for storing said output voltage to provide said electrical charge;
   d. means providing a first fixed voltage as a first additional input to said integrating means; and
   e. means providing a second fixed voltage as a second additional input to said integrating means at frequent, relatively short time increments, the values of said first and second voltages being such that the net effect of said first and second additional inputs during said time increments is to balance the integration rate of said integrating means to zero.

2. The invention according to claim 1 wherein said integrating means comprises an operational amplifier.

3. The invention according to claim 1 wherein said first additional input is significantly larger than any anticipated errors due to imperfection of circuit components.

4. The invention according to claim 3 wherein said time increments occur at a frequency great enough to prevent said capacitive means from accumulating any significant charge as a result of said first additional input.

5. The invention according to claim 4 wherein said time increments occur at a rate of at least 100 per second.

6. The invention according to claim 5 wherein the duration of said time increments is less than one-fourth the time duration between occurence of said increments.

7. The invention according to claim 1 wherein said second fixed voltage is normally shunted to ground, and additional means are provided for applying a voltage during said time increments to cause said second fixed voltage to be applied to said integrator means as said second additional input.

8. The invention according to claim 7 wherein said additional means comprise a field effect transistor.

9. The invention according to claim 1 wherein said simulated instrument comprises a fuel depletion gauge and said electrical signal is commensurate with fuel flow.

10. The invention according to claim 1 wherein capacitive means has a capacitance of less than 500 microfarads.

* * * * *